United States Patent
Li

(10) Patent No.: US 9,531,856 B2
(45) Date of Patent: Dec. 27, 2016

(54) MOBILE TERMINAL AND METHOD FOR PROTECTING AGAINST MISTAKEN DIALING

(71) Applicant: Huizhou TCL Mobile Communication Co., Ltd., Huizhou, Guangdong (CN)

(72) Inventor: Cansong Li, Huizhou (CN)

(73) Assignee: Huizhou TCL Mobile Communication Co., Ltd., Huizhou (CN)

( * ) Notice: Subject to any disclaimer, the term of this patent is extended or adjusted under 35 U.S.C. 154(b) by 0 days.

(21) Appl. No.: 14/648,472

(22) PCT Filed: May 23, 2014

(86) PCT No.: PCT/CN2014/078256
§ 371 (c)(1),
(2) Date: May 29, 2015

(87) PCT Pub. No.: WO2015/135255
PCT Pub. Date: Sep. 17, 2015

(65) Prior Publication Data
US 2015/0358449 A1 Dec. 10, 2015

(30) Foreign Application Priority Data
Mar. 12, 2014 (CN) .......................... 2014 1 0091141

(51) Int. Cl.
*H04M 1/67* (2006.01)
*G06F 3/041* (2006.01)
(Continued)

(52) U.S. Cl.
CPC .............. *H04M 1/67* (2013.01); *G06F 3/0412* (2013.01); *G06F 3/04817* (2013.01);
(Continued)

(58) Field of Classification Search
CPC H04M 1/67; H04M 1/72577; H04M 2250/12; G06F 3/04883; G06F 3/0412; G06F 2203/04101; G03F 3/04817; H04B 7/18593; H04B 10/0705
See application file for complete search history.

(56) References Cited

U.S. PATENT DOCUMENTS 9,030,418 B2 * 5/2015 Ku .......................... G06F 3/0416
345/156
9,207,854 B2 * 12/2015 Kim ...................... G06F 3/0488
(Continued)

FOREIGN PATENT DOCUMENTS

CN     101825964 A     9/2010
CN     102841684 A    12/2012
(Continued)

OTHER PUBLICATIONS

English Abstract of CN102841684 A.
(Continued)

*Primary Examiner* — Andrew Wendell
(74) *Attorney, Agent, or Firm* — Ladas & Parry LLP

(57) ABSTRACT

A mobile terminal and a mistaken dialing preventing method thereof are provided. The mistaken dialing preventing method is based on a mobile terminal comprising a distance sensor and a touch screen, and comprises: when the touch screen is not locked and is displaying a dial plate icon, activating the distance sensor to detect whether there is an obstruction within an effective distance above the touch screen; if there is an obstruction, then detecting by the distance sensor a current distance between the obstruction and the touch screen of the mobile terminal; and if the current distance is smaller than a preset critical distance threshold, then controlling the touch screen to not display the dial plate icon and deactivating the distance sensor by the mobile terminal. In this way, the present disclosure can
(Continued)

automatically deactivate the call program of the smartphone to absolutely prevent mistaken dialing with a very satisfactory effect.

17 Claims, 2 Drawing Sheets

(51) Int. Cl.
    *G06F 3/0481*      (2013.01)
    *G06F 3/0488*      (2013.01)
    *H04M 1/725*      (2006.01)

(52) U.S. Cl.
    CPC .... *G06F 3/04883* (2013.01); *H04M 1/72577* (2013.01); *G06F 2203/04101* (2013.01); *H04M 2250/12* (2013.01)

(56) References Cited

U.S. PATENT DOCUMENTS

| | | | |
|---|---|---|---|
| 2008/0068347 A1 | 3/2008 | Morohoshi | |
| 2008/0220752 A1* | 9/2008 | Forstall | H04M 1/56 455/415 |
| 2010/0081418 A1* | 4/2010 | Chiashi | H04M 1/0241 455/414.1 |
| 2011/0004821 A1* | 1/2011 | Miyazawa | G06F 3/04883 715/702 |
| 2013/0260836 A1* | 10/2013 | Tsunoda | H04M 1/0266 455/566 |
| 2013/0278524 A1* | 10/2013 | Wang | G06F 3/0416 345/173 |
| 2014/0068243 A1* | 3/2014 | Li | G06F 3/00 713/100 |
| 2014/0237412 A1* | 8/2014 | Yoon | G06F 3/04886 715/773 |

FOREIGN PATENT DOCUMENTS

| | | |
|---|---|---|
| CN | 102946472 A | 2/2013 |
| CN | 103139389 A | 6/2013 |

OTHER PUBLICATIONS

English Abstract of CN102946472 A.
English Abstract of CN101825964 A.
English translation of CN CN103139389.

\* cited by examiner

MOBILE TERMINAL AND METHOD FOR PROTECTING AGAINST MISTAKEN DIALING

RELATED APPLICATION

This application is a national phase entry under 35 USC 371 of International Patent Application No PCT/CN2014/078256 filed on 23 May 2014, which claims priority from Chinese Patent Application No. 2014100911419 filed on 12 Mar. 2014, the disclosures of which are incorporated in their entirety by reference herein.

FIELD OF THE INVENTION

The present disclosure relates to the technical field of mobile terminal communication technologies, and more particularly, to a mobile terminal and a method for protecting against mistaken dialing by an inadvertent keystroke.

BACKGROUND OF THE INVENTION

With advancement of the information society and rapid growth of the communication popularization rate, mobile communication terminals having a touch screen such as smartphones have become indispensable to the modern people's life. However, although they bring about conveniences in the life, the smartphones sometimes also cause troubles, and the most common trouble is mistaken dialing by an inadvertent keystroke: when the user puts the smartphone into a pocket of the clothes with the screen being unlocked, it is very likely that the dial keypad will be activated to cause a mistaken dialing due to contact of the smartphone with some other object. This not only causes troubles to the user (and to the called party), but also incurs unnecessary communication fees.

Currently, there are mainly two methods to prevent mistaken dialing: one is to additionally make dialing judgement, that is, a dialog box is popped up each time a phone number is selected and dialed so that a mistaken dialing is prevented through "OK" or "Cancel" options on the dialog box. The other method is to determine whether there is a voice speech after a call has been successfully dialed, that is, it is detected whether there is an input of a user's voice speech when a call is dialed, and if no audio signal is detected within a preset time, then the call is terminated automatically.

However, the first method might still cause a mistaken dialing due to a second mis-touch that falsely selects the "OK" option on the dialog box, so it cannot absolutely prevent the mistaken dialing and the mistaken dialing prevention effect is unsatisfactory. On the other hand, the second method is only able to prevent long-time calling after the butt call has been dialed (i.e., to prevent long-time lasting of the butt call) but cannot prevent the mistaken dialing action in a true sense; in other words, the judgement is made after the butt call has been successfully dialed, and this not only causes embarrassment to the called party but also wastes the communication fee of the calling party.

SUMMARY OF THE INVENTION

Accordingly, a technical problem to be solved by the present disclosure is to provide a mobile terminal and a mistaken dialing prevention method thereof, which can automatically deactivate a call program of a smartphone to absolutely prevent mistaken dialing with a very satisfactory effect.

To solve the aforesaid technical problem, a technical solution adopted in the present disclosure is as follows: a mistaken dialing preventing method for a mobile terminal is provided, the mobile terminal comprises a distance sensor and a touch screen, and the method comprises the following steps of: when the touch screen is not locked and is displaying a dial plate icon, activating the distance sensor to detect whether there is an obstruction within an effective distance above the touch screen; if there is an obstruction, then detecting by the distance sensor a current distance between the obstruction and the touch screen of the mobile terminal; and if the current distance is smaller than a preset critical distance threshold, then controlling the touch screen to not display the dial plate icon and deactivating the distance sensor by the mobile terminal, wherein the mobile terminal deactivates the touch screen to not display the dial plate icon, or the mobile terminal controls the touch screen to keep activated but not display the dial plate icon, and the preset critical distance threshold is 3 mm.

In one embodiment, the mistaken dialing preventing method further comprises the following step of: if the distance sensor detects that there is not an obstruction within the effective distance above the touch screen, then detecting whether the dial plate icon is displayed on the touch screen, and if the dial plate icon is not displayed, then deactivating the distance sensor.

In one embodiment, the mistaken dialing preventing method further comprises the following step of: if the distance sensor detects that there is not an obstruction within the effective distance above the touch screen, then detecting whether the dial plate icon is displayed on the touch screen, and if the dial plate icon is displayed, then controlling the distance sensor to keep activated.

To solve the aforesaid technical problem, another technical solution adopted in the present disclosure is as follows: a mistaken dialing preventing method for a mobile terminal is provided, the mobile terminal comprises a distance sensor and a touch screen, and the method comprises the following steps of: when the touch screen is not locked and is displaying a dial plate icon, activating the distance sensor to detect whether there is an obstruction within an effective distance above the touch screen; if there is an obstruction, then detecting by the distance sensor a current distance between the obstruction and the touch screen of the mobile terminal; and if the current distance is smaller than a preset critical distance threshold, then controlling the touch screen to not display the dial plate icon and deactivating the distance sensor by the mobile terminal.

In one embodiment, the mistaken dialing preventing method further comprises the following step of: if the distance sensor detects that there is not an obstruction within the effective distance above the touch screen, then detecting whether the dial plate icon is displayed on the touch screen, and if the dial plate icon is not displayed, then deactivating the distance sensor.

In one embodiment, the mistaken dialing preventing method further comprises the following step of: if the distance sensor detects that there is not an obstruction within the effective distance above the touch screen, then detecting whether the dial plate icon is displayed on the touch screen, and if the dial plate icon is displayed, then controlling the distance sensor to keep activated.

In one embodiment, the step of controlling the touch screen to not display the dial plate icon by the mobile terminal comprises the following steps of: deactivating by the mobile terminal the touch screen to not display the dial plate icon; or controlling by the mobile terminal the touch screen to keep activated but not display the dial plate icon.

In one embodiment, the preset critical distance threshold is 3 mm.

To solve the aforesaid technical problem, yet another technical solution adopted in the present disclosure is as follows: a mobile terminal is provided, the mobile terminal comprises a distance sensor, a touch screen and a controlling and processing module, and the controlling and processing module, comprises: a controlling unit, being configured to, when the touch screen is not locked and is displaying a dial plate icon, control the distance sensor to be activated to detect whether there is an obstruction within an effective distance above the touch screen; if the distance sensor detects that there is an obstruction within the effective distance above the touch screen, then the controlling unit controls the distance sensor to detect a current distance between the obstruction and the touch screen of the mobile terminal; and a determining unit, being configured to determine if the current distance is smaller than a preset critical distance threshold, wherein if it is determined that the current distance is smaller than a preset critical distance threshold, then the controlling unit controls the touch screen to not display the dial plate icon and deactivates the distance sensor.

In one embodiment, the controlling and processing module, further comprises a detecting unit, and if the distance sensor detects that there is not an obstruction within the effective distance above the touch screen, then the detecting unit detects whether the dial plate icon is displayed on the touch screen, and if the dial plate icon is not displayed, then the controlling unit deactivates the distance sensor.

In one embodiment, the controlling and processing module, further comprises a detecting unit, and if the distance sensor detects that there is not an obstruction within the effective distance above the touch screen, then the detecting unit detects whether the dial plate icon is displayed on the touch screen, and if the dial plate icon is displayed, then the controlling unit controls the distance sensor to keep activated.

In one embodiment, the controlling unit deactivates the touch screen to not display the dial plate icon; or the controlling unit controls the touch screen to keep activated but not display the dial plate icon.

In one embodiment, the preset critical distance threshold is 3 mm.

As compared to the prior art, the present disclosure has the following benefits: when the touch screen is not locked, the distance sensor is activated to detect whether there is an obstruction within an effective distance above the touch screen; if there is an obstruction, then the distance sensor detects a current distance between the obstruction and the touch screen of the mobile terminal; and if the current distance is smaller than a preset critical distance threshold, then the touch screen is controlled to not display the dial plate icon and the distance sensor is deactivated. In this way, the present disclosure automatically deactivates a call program to entirely prevent mistaken dialing.

DETAILED DESCRIPTION OF THE INVENTION

A primary objective of the present disclosure is to provide a mistaken dialing preventing method for a mobile terminal. According to this method, when a touch screen is not locked, a distance sensor is activated to detect whether there is an obstruction within an effective distance above the touch screen: if there is an obstruction, then the distance sensor detects a current distance between the obstruction and the touch screen of the mobile terminal; and if the current distance is smaller than a preset critical distance threshold, the call program is automatically deactivated. In this way, mistaken dialing can be entirely prevented.

The mistaken dialing preventing method of the present disclosure is based on a mobile terminal that is provided at least with a distance sensor and a touch screen. Throughout the present disclosure, a smartphone is taken as an example of the mobile terminal for description. Of course, the mobile terminal is not limited to a smartphone, but may be any communication device with the communication function, e.g., a portable communication device, a PDA (Personal Digital Assistant) with the communication function, a tablet computer, etc.

Figure 1:
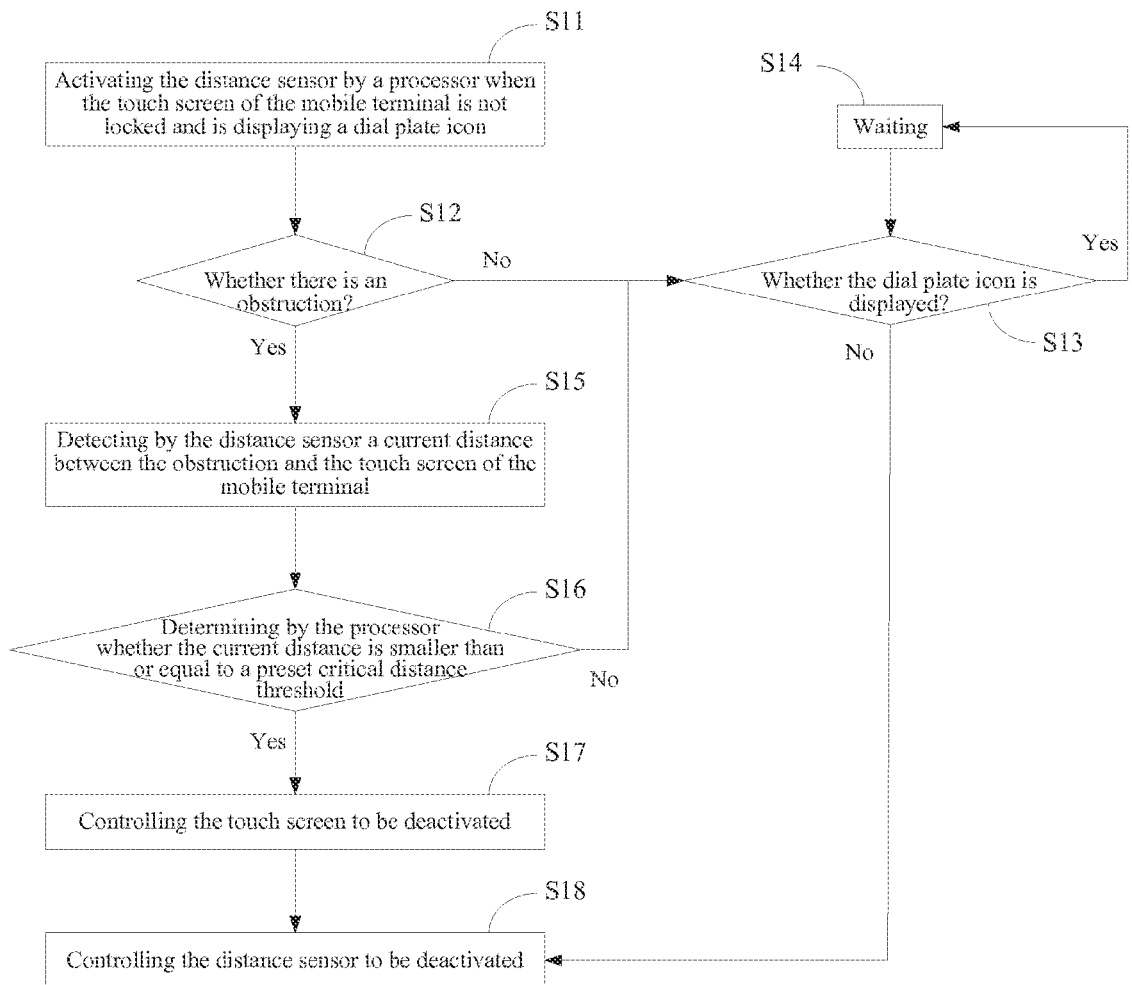
FIG. 1 is a flowchart diagram of a mistaken dialing preventing method for a mobile terminal according to one embodiment of the present disclosure.
Figure 2:
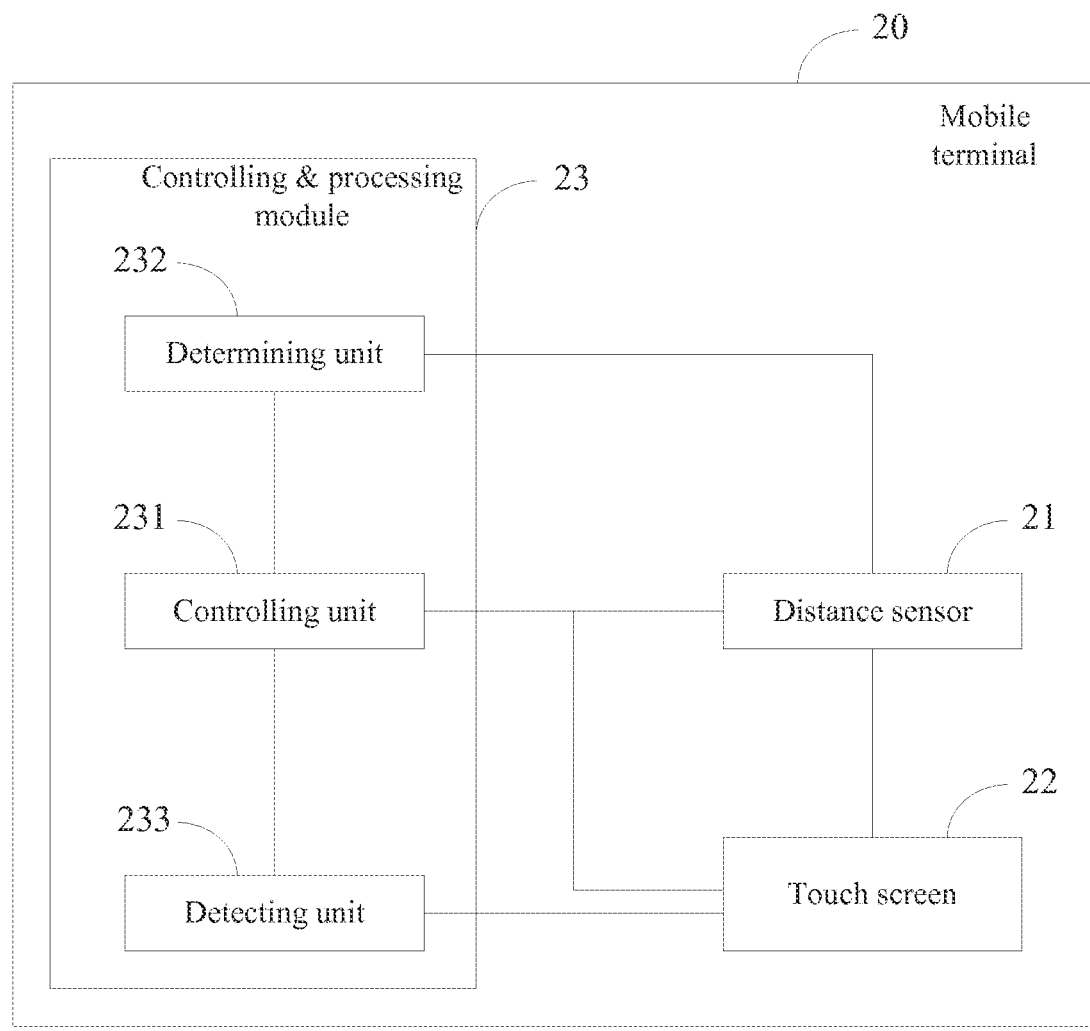
FIG. 2 is functional block diagram of a mobile terminal according to one embodiment of the present disclosure.

To make the objectives, technical solutions and technical effects of the present disclosure clearer, a detailed description will be further made on embodiments of the present disclosure with reference to FIG. 1 and FIG. 2.

FIG. 1 is a flowchart diagram of a mistaken dialing preventing method according to a preferred embodiment of the present disclosure. As shown in FIG. 1, the mistaken dialing preventing method of this embodiment comprises the following steps:

Step S11: activating the distance sensor when the touch screen of the mobile terminal is not locked and is displaying a dial plate icon.

The present disclosure is related to situations where the smartphone is used abnormally by the user. Determining whether the smartphone is used normally or abnormally can be achieved through technologies such as infrared induction, and this is beyond the scope of the present disclosure and thus will not be disclosed in detail herein.

When a user puts the smartphone into a pocket of the underclothes or a bag with the touch screen unlocked due to carelessness or in case of an emergency, it is very likely that the dial plate will be activated and the dial plate icon will be displayed on the touch screen due to contact. It shall be appreciated that, activating the dial plate in this embodiment only represents one way of activating the call program, i.e., activating the dial plate is just taken as an example in the present disclosure to describe the way of activating the call program. Of course, other ways may also be possible, e.g., activating the "recent calls" menu (including all the completed calls and missed calls), or activating the "address list" menu.

Step S12: detecting by the distance sensor whether there is an obstruction within an effective distance above the touch screen of the mobile terminal.

When it is detected that the dial plate is activated, a processor built in the mobile terminal controls the distance sensor to be activated through IO (Input/Output) controlling signals, and the processor controls the distance sensor and reads the data of the distance sensor through I2C (Inter-Integrated Circuit) control signals. In this embodiment, the distance sensor is typically an infrared distance sensor and generally works as follows: the infrared distance sensor is activated and emits infrared light pulses, and when no obstruction (e.g., a human hand) passes within an effective distance above the touch screen, the infrared distance sensor cannot receive light pulses reflected back from the obstruction (i.e., the outputted sampling value of the infrared distance sensor is zero), and then step S13 is executed; when there is an obstruction within the effective distance above the touch screen, the obstruction reflects the infrared light pulses emitted from the infrared distance sensor back to the infrared distance sensor, and in this case, the outputted sampling value is not zero and then step S15 is executed.

Step S13: determining whether the dial plate icon is displayed on the touch screen of the mobile terminal.

If it is determined by the mobile terminal that the dial plate icon is still displayed on the touch screen (i.e., the call program is activated), then step S14 is executed to keep waiting, and the mobile terminal controls the distance sensor to keep activated. If it is determined by the mobile terminal that the dial plate icon is no longer displayed on the touch screen (i.e., the call program is deactivated), then step S18 is executed to deactivate the distance sensor, and in this case, mistaken dialing is unlikely to occur, so the touch screen can keep activated.

Step S14: waiting.

During the waiting, the touch screen of the mobile terminal and the distance sensor keep activated. In this embodiment, the mobile terminal can detect whether the dial plate icon is displayed on the touch screen within a preset period, i.e., the step S13 and the step S14 are performed periodically until the dial plate icon is deactivated.

Step S15: detecting by the distance sensor a current distance between the obstruction and the touch screen of the mobile terminal.

The distance sensor transmits the sampling value of the infrared light pulses reflected back from the obstruction to the processor of the mobile terminal, and then the processor can acquire the current distance between the distance sensor and the obstruction through internal computation.

Step S16: determining whether the current distance is smaller than or equal to a preset critical distance threshold.

In this embodiment, the preset critical distance threshold is typically 3 mm. Of course, the critical distance threshold may be defined as other values by those skilled in the art depending on practical needs. The preset critical distance threshold refers to a critical value used by the mobile terminal to determine whether the mistaken dialing preventing method should be adopted, while the effective distance above the touch screen in the step S12 refers to an effective detecting distance of the infrared light pulses imparted by the manufacturer to the distance sensor of the mobile terminal. The aforesaid two distances have different concepts, but may have values identical to or different from each other.

If it is determined by the mobile terminal that the current distance is greater than a preset critical distance threshold, it means that mistaken dialing will not happen and in this case, the touch screen and the distance sensor are controlled to keep activated, i.e., the step S13 is executed. If it is determined by the mobile terminal that the current distance is smaller than or equal to the preset critical distance threshold, then the touch screen and the distance sensor are controlled to be deactivated, i.e., step S17 and step S18 are executed.

Step S17: controlling the touch screen to be deactivated.

Step S18: controlling the distance sensor to be deactivated.

The primary objective of the present disclosure is to prevent mistaken dialing, and the locking of the touch screen is only for purpose of preventing mal-operation caused by the obstruction on the dial plate, so in other embodiments the step S18 may be: terminating the call program by the mobile terminal.

In other words, when an obstruction approaches the touch screen and it is determined that a mistaken dialing is likely to happen, the mobile terminal deactivates the call program and exits the dial plate. In this case, the touch screen does not display the dial plate icon but is not locked, and the distance sensor can also keep activated. Alternatively, the mobile terminal controls the touch screen to lock the dial plate icon, but does not control the touch screen to be locked and the distance sensor to be deactivated; instead, the mobile terminal mainly prevents any operations on the call program dialing function (the dial plate icon).

As can be seen from the above descriptions, this embodiment works as follows: when a touch screen is not locked, a distance sensor is activated to detect whether there is an obstruction within an effective distance above the touch screen; if there is an obstruction, then the distance sensor detects a current distance between the obstruction and the touch screen of the mobile terminal; and if the current distance is smaller than a preset critical distance threshold, a call program is automatically deactivated. As compared to the two methods in the prior art, this embodiment eliminates the need of a second judgement, and the mobile terminal can make automatic and intelligent judgement to prevent a mistaken dialing action before the butt call is successfully dialed, so it can absolutely prevent the mistaken dial with a very satisfactory mistaken dialing prevention effect. Moreover, the call program of the smartphone can be deactivated automatically, so the problems of information disclosure and tedious operations resulting from locking the screen several times by the user can be avoided.

The present disclosure further provides a mobile terminal. Referring to FIG. 2, a mobile terminal 20 of this embodiment comprises a distance sensor 21, a touch screen 22 and a controlling and processing module, 23, and the controlling and processing module, 23 comprises a controlling unit 231, a determining unit 232 and a detecting unit 233. The mobile terminal 20 further comprises a non-transitory program storage medium and a processor. The non-transitory program storage medium stores a program executed by the processor to perform the method as described in above. The controlling and processing module 23 comprising the controlling unit 231, the determining unit 232 and the detecting unit 233 is software module or software unit which is stored in the non-transitory program storage medium and executed by the processor.

The controlling unit 231 is configured to, when the touch screen 22 is not locked and is displaying a dial plate icon, control the distance sensor 21 to be activated to detect whether there is an obstruction within an effective distance above the touch screen 22.

If the distance sensor 21 detects that there is an obstruction within the effective distance above the touch screen 22, then the controlling unit 231 controls the distance sensor 21 to detect a current distance between the obstruction and the touch screen 22.

The determining unit 232 is configured to determine if the current distance is smaller than a critical distance threshold preset by the controlling and processing module, 23, and the preset critical distance threshold is typically 3 mm in this embodiment. If it is determined that the current distance is smaller than a preset critical distance threshold, then the controlling unit 231 controls the touch screen 22 to not display the dial plate icon and deactivates the distance sensor 21.

If the distance sensor 21 detects that there is not an obstruction within the effective distance above the touch screen 22, then the detecting unit 233 detects whether the dial plate icon is displayed on the touch screen 22, and if the dial plate icon is not displayed, then the controlling unit 231 deactivates the distance sensor 21; and if the dial plate icon is displayed, then the controlling unit 231 controls the distance sensor 21 to keep activated.

In this embodiment, the controlling unit 231 deactivates the touch screen 22 to not display the dial plate icon; or the controlling unit 231 controls the touch screen 22 to keep activated but not display the dial plate icon.

The mobile terminal 20 shown in FIG. 2 of the present disclosure is based on the method of the embodiment shown in FIG. 1, so it has the same benefits. The functional modules can execute the steps of the method of the embodiments correspondingly, and this will not be further described herein. It shall be understood that, the division of the individual modules of the mobile terminal 20 disclosed in the present disclosure only represents a division of logical functions, and there may be other division manners in practical implementations. For example, a number of modules may be combined or may be integrated into another system, or some features may be omitted or may not be performed. Furthermore, mutual coupling or communication connections between the modules may be achieved via a plurality of interfaces, or in an electrical way or some other way.

As integral components of the mobile terminal 20, the aforesaid functional modules may be or may not be physical blocks, may be co-located at a same site or be distributed in a plurality of network units, and may be implemented either in the form of hardware or in the form of software function blocks. The objective of the present disclosure can be achieved by optionally using parts of or all of the modules depending on the actual need.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall ail be covered within the scope of the present disclosure.

What is claimed is:

1. A method for protecting against mistaken dialing of a mobile terminal by an inadvertent keystroke, the mobile terminal comprising a distance sensor and a touch screen, the method comprising the following steps of:
   when the touch screen is not locked and is displaying a dial plate icon, activating the distance sensor to detect whether there is an obstruction within an effective distance above the touch screen;
   when there is an obstruction, then detecting by the distance sensor a current distance between the obstruction and the touch screen of the mobile terminal; and
   when the current distance is smaller than a preset critical distance threshold, then controlling the touch screen to not display the dial plate icon and deactivating the distance sensor by the mobile terminal, wherein the mobile terminal controls the touch screen to keep activated but not display the dial plate icon, and the preset critical distance threshold is 3 mm.

2. The method of claim 1, further comprising the following step of:
   when the distance sensor detects that there is not an obstruction within the effective distance above the touch screen, then detecting whether the dial plate icon is displayed on the touch screen, and when the dial plate icon is not displayed, then switching off the distance sensor.

3. The method of claim 1, further comprising the following step of:
   when the distance sensor detects that there is not an obstruction within the effective distance above the touch screen, then detecting whether the dial plate icon is displayed on the touch screen, and when the dial plate icon is displayed, then controlling the distance sensor to keep activated.

4. The method of claim 1, wherein the distance sensor emits infrared light pulses and determines whether there is the obstruction within the effective distance above the touch screen of the mobile terminal by the following steps:
   when the distance sensor detects reflected infrared light pulses, then it is determined that there is the obstruction within the effective distance above the touch screen of the mobile terminal;
   when the distance sensor does not detect reflected infrared light pulses, then it is determined that there is no obstruction within the effective distance above the touch screen of the mobile terminal.

5. The method of claim 4, wherein the infrared light pulses emitted by the distance sensor are further utilized to calculate the distance between the obstruction and the touch screen of the mobile terminal when it is determined that there is the obstruction within the effective distance above the touch screen of the mobile terminal.

6. A method for protecting against mistaken dialing of a mobile terminal by an inadvertent keystroke, the mobile terminal comprising a distance sensor and a touch screen, the method comprising the following steps of:
   when the touch screen is not locked and is displaying a dial plate icon, activating the distance sensor to detect whether there is an obstruction within an effective distance above the touch screen;
   when there is an obstruction, then detecting by the distance sensor a current distance between the obstruction and the touch screen of the mobile terminal; and
   when the current distance is smaller than a preset critical distance threshold, then controlling the touch screen to not display the dial plate icon and switching off the distance sensor by the mobile terminal;
   wherein the step of controlling the touch screen to not display the dial plate icon by the mobile terminal comprises the following steps of:
   controlling by the mobile terminal the touch screen to keep activated but not display the dial plate icon.

7. The method of claim 6, further comprising the following step of:
   when the distance sensor detects that there is not an obstruction within the effective distance above the touch screen, then detecting whether the dial plate icon is displayed on the touch screen, and when the dial plate icon is not displayed, then switching off the distance sensor.

8. The method of claim 6, further comprising the following step of:
   when the distance sensor detects that there is not an obstruction within the effective distance above the touch screen, then detecting whether the dial plate icon is displayed on the touch screen, and when the dial plate icon is displayed, then controlling the distance sensor to keep activated.

9. The method of claim 6, wherein the distance sensor emits infrared light pulses and determines whether there is the obstruction within an effective distance above the touch screen of the mobile terminal by the following steps:
when the distance sensor detects reflected infrared light pulses, then it is determined that there is the obstruction within an effective distance above the touch screen of the mobile terminal;
when the distance sensor does nut detect reflected infrared light pulses, then it is determined that there is no obstruction within an effective distance above the touch screen of the mobile terminal.

10. The method of claim 9, wherein the infrared light pulses emitted by the distance sensor are further utilized to calculate the distance between the obstruction and the touch screen of the mobile terminal when it is determined that there is the obstruction within an effective distance above the touch screen of the mobile terminal.

11. A mobile terminal, comprising:
a touch screen;
a distance sensor, configured to detect whether there is an obstruction within an effective distance above the touch screen when the touch screen is not locked and is displaying a dial plate icon; and
a processor;
when the distance sensor detects that there is an obstruction within the effective distance above the touch screen, a current distance between the obstruction and the touch screen of the mobile terminal is obtained through the detection of the distance sensor; and
the current distance is smaller than a preset critical distance threshold, the processor controls the touch screen to not display the dial plate icon and switches off the distance sensor;
wherein the processor controls the touch screen to keep activated but not display the dial plate icon.

12. The mobile terminal of claim 11, further comprising a non-transitory program storage medium, the non-transitory program storage medium stores a controlling unit, a determining unit and a detecting unit; when the distance sensor detects that there is not the obstruction within the effective distance above the touch screen, then the detecting unit detects whether the dial plate icon is displayed on the touch screen, and when the dial plate icon is not displayed, then the controlling unit switches off the distance sensor.

13. The mobile terminal of claim 11, further comprising a non-transitory program storage medium, the non-transitory program storage medium stores a controlling unit, a determining unit and a detecting unit; when the distance sensor detects that there is not the obstruction within the effective distance above the touch screen, then the detecting unit detects whether the dial plate icon is displayed on the touch screen, and when the dial plate icon is displayed, then the controlling unit controls the distance sensor to keep activated.

14. The mobile terminal of claim 11, wherein the preset critical distance threshold is 3 mm.

15. The mobile terminal of claim 11, further comprising a non-transitory program storage medium, the non-transitory program storage medium stores a controlling unit and a determining unit; wherein the controlling unit is configured to control the distance sensor to be activated to detect whether there is the obstruction within the effective distance above the touch screen; the determining unit is configured to determine whether the current distance is smaller than the preset critical distance threshold, when the current distance is smaller than the preset critical distance threshold, the controlling unit controls the touch screen to not display the dial plate icon and switches off the distance sensor.

16. The mobile terminal of claim 11, wherein the distance sensor is an infrared distance sensor, it emits infrared light pulses to determine there is the obstruction within the effective distance above the touch screen of the mobile terminal when the distance sensor detects reflected infrared light pulses; and there isn't the obstruction within the effective distance above the touch screen of the mobile terminal when the distance sensor does not detect reflected infrared light pulses.

17. The mobile terminal of claim 16, wherein the distance sensor emits infrared light pulses to calculate the distance between the obstruction and the touch screen of the mobile terminal when it is determined that there is the obstruction within the effective distance above the touch screen of the mobile terminal.

* * * * *